(12) United States Patent
Kitaoka

(10) Patent No.: US 8,501,649 B2
(45) Date of Patent: Aug. 6, 2013

(54) OPTICAL GLASS

(75) Inventor: Kenji Kitaoka, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 111 days.

(21) Appl. No.: 13/198,040

(22) Filed: Aug. 4, 2011

(65) Prior Publication Data

US 2012/0035042 A1 Feb. 9, 2012

(30) Foreign Application Priority Data

Aug. 6, 2010 (JP) .................................. 2010-177395
Jul. 21, 2011 (JP) .................................. 2011-159941

(51) Int. Cl.
*C03C 3/068* (2006.01)

(52) U.S. Cl.
USPC .................................. 501/47; 501/48; 501/79

(58) Field of Classification Search
USPC .......................................... 501/77–79, 47, 48
See application file for complete search history.

(56) References Cited

U.S. PATENT DOCUMENTS

| 7,598,189 | B2 * | 10/2009 | Fujiwara et al. | 501/48 |
| 7,670,974 | B2 * | 3/2010 | Fujiwara et al. | 501/45 |
| 7,799,714 | B2 * | 9/2010 | Fujiwara | 501/47 |
| 2004/0259714 | A1 * | 12/2004 | Fujiwara et al. | 501/45 |
| 2006/0150682 | A1 * | 7/2006 | Fujiwara et al. | 65/102 |
| 2007/0111875 | A1 * | 5/2007 | Fujiwara | 501/47 |

FOREIGN PATENT DOCUMENTS

| JP | 63-20775 B2 | 4/1988 |
| JP | 2004-315324 | 11/2004 |
| JP | 2005-8518 | 1/2005 |
| JP | 2006-52119 | 2/2006 |
| JP | 2006-111499 | 4/2006 |
| JP | 2007-15904 | 1/2007 |

* cited by examiner

*Primary Examiner* — Karl Group
(74) *Attorney, Agent, or Firm* — Oblon, Spivak, McClelland, Maier & Neustadt, L.L.P.

(57) ABSTRACT

The present invention provides an optical glass, containing, in % by weight on an oxide basis, 30 to 50% of $P_2O_5$, 18 to 43% of BaO, 2 to 12% of $B_2O_3$, 1.4 to 5% of $Al_2O_3$, more than 0 to 6% of $Li_2O$, more than 0 to 9% of $La_2O_3$, 0.1 to 8% of MgO, 0 to 10% of CaO, 0 to 15% of SrO, 0 to 5% of ZnO, 0 to 7% of $Gd_2O_3$, and 0 to 3% of $SiO_2$, and having optical constants of a refractive index $n_d$ of 1.59 to 1.63 and an Abbe number $v_d$ of 63 to 68.

16 Claims, No Drawings

US 8,501,649 B2

OPTICAL GLASS

TECHNICAL FIELD

The present invention relates to a phosphate optical glass which has a low refractive index and low dispersion, and which is applicable to precision press-molding and excellent in moldability of a plate material and moldability of gobs for a preform.

BACKGROUND ART

A low dispersion glass is a glass useful for aberration correction of an optical element. In an imaging system lens typically used in a digital camera, there is a growing demand for decreasing the number of lenses to miniaturize an optical system, and a glass molded lens which has been precision-pressed into an aspherical shape is in heavy usage. For aberration correction, lower dispersion is preferred.

In order to achieve low dispersion, there is a technique of introducing fluorine into a glass. However, in such technique, there have been problems that since fluorine providing an environmental load vaporizes at the time of glass melting, an apparatus for removing fluorine is required, striae occurs by deviation in composition caused by the vaporization of fluorine, or it becomes difficult to mold a glass because of its extreme low-softening due to the introduction of fluorine.

In view of the above and production cost, an oxide glass is preferred. Consequently, studies of phosphate-barium glass which is expected to achieve low dispersion among the oxide glass have been made (Patent Documents 1 to 4). From the viewpoint of compactification of the lens, it is desirable that a glass has a high refractive index together with low dispersion. However, there has been no glass having sufficient low dispersibility ($v_d \geqq 63$) in a specified high refractive index region ($n_d \geqq 1.59$), and being excellent in melt stability, press moldability and chemical durability.

Patent Document 1: JP-B-63-20775
Patent Document 2: JP-A-2005-8518
Patent Document 3: JP-A-2007-15904
Patent Document 4: JP-A-2006-111499

SUMMARY OF THE INVENTION

An objective of the invention is to provide an optical glass having optical constants of a refractive index ($n_d$) of 1.59 or more and an Abbe number ($v_d$) of 63 or more, being excellent in melt stability of the glass, having a softening temperature suitable for precision press-molding and a liquid phase viscosity suitable for moldability of gobs for a preform, and moreover, being excellent in chemical durability.

The present invention provides an optical glass, comprising, in % by weight on an oxide basis,
30 to 50% of $P_2O_5$,
18 to 43% of BaO,
2 to 12% of $B_2O_3$,
1.4 to 5% of $Al_2O_3$,
more than 0 to 6% of $Li_2O$,
more than 0 to 9% of $La_2O_3$,
0.1 to 8% of MgO,
0 to 10% of CaO,
0 to 15% of SrO,
0 to 5% of ZnO,
0 to 7% of $Gd_2O_3$, and
0 to 3% of $SiO_2$, and
having optical constants of a refractive index $n_d$ of 1.59 to 1.63 and an Abbe number $v_d$ of 63 to 68.

Incidentally, unless otherwise specified, the above range of number of the chemical composition means the inclusion of both of the lower and higher limit. That is, the term "A to B" means "A or more and B or less". Further, the term "more than 0%" means the inclusion as an essentially component.

The phosphate optical glass of the present invention (hereinafter referred to as "the present glass") contains $P_2O_5$, BaO, $B_2O_3$, $Al_2O_3$, $Li_2O$, $La_2O_3$ and MgO as essential components, so that optical properties of a refractive index ($n_d$) of 1.59 to 1.63 and an Abbe number ($v_d$) of 63 to 68 can be achieved. Further, the present glass contains $La_2O_3$, MgO and $Li_2O$ as essential components, so that it is also possible to make both of chemical durability (mainly due to $La_2O_3$ and MgO components) and low dispersibility (mainly due to a $Li_2O$ component) compatible with each other.

According to the present glass, in addition to the above properties, the glass transition temperature (Tg) can be adjusted preferably to 570° C. or lower, so that precision press-molding can be performed at high productivity. Further, the viscosity ($\eta_{LT}$) at the liquid phase temperature of the present glass can be adjusted preferably to 6 dPa·s or more, so that fine gobs can also be manufactured.

MODE FOR CARRYING OUT THE INVENTION

The invention is based on the results of various studies for obtaining an optical glass having a refractive index ($n_d$) of 1.59 or more and an Abbe number ($v_d$) of 63 or more and being excellent in chemical durability. The reasons for setting the ranges of the respective components of the present invention are as follows. Incidentally, in this specification, "%" means "% by mass" unless otherwise specified. Further, the chemical composition is understood to be on an oxide basis.

In the present glass, $P_2O_5$ is an essential component, a main component which forms the glass (a glass-forming oxide) and a component of increasing the viscosity of the glass. In the present glass, when the content of $P_2O_5$ is too small, there is a concern that the glass becomes unstable and that the viscosity thereof is decreased. Accordingly, the content of $P_2O_5$ is 30% or more in the present glass. The content of $P_2O_5$ is preferably 33% or more, and more preferably 35% or more. On the other hand, when the content of $P_2O_5$ is too large, the refractive index is decreased. Accordingly, the content of $P_2O_5$ is 50% or less in the present glass. The content of $P_2O_5$ is preferably 48% or less, and more preferably 46% or less.

In the present glass, BaO is an essential component and has effects of increasing the refractive index of the glass, stabilizing the glass and enhancing chemical durability. When the content of BaO is too small, there is a concern that the chemical durability becomes insufficient. Accordingly, the content of BaO is 18% or more. The content of BaO is preferably 20% or more, more preferably 21% or more, and particularly preferably 25% or more. On the other hand, when the content of BaO is too large, dispersibility is enlarged to make it difficult to achieve low dispersion. Accordingly, the content of BaO is 43% or less. The content of BaO is preferably 40% or less, more preferably 38% or less, and particularly preferably 30% or less.

In the present glass, $B_2O_3$ is an essential component and a component effective for improving meltability, stability and durability of the glass. In order to exhibit the effects, the content of $B_2O_3$ is 2% or more. The content of $B_2O_3$ is preferably 2.5% or more, more preferably 5% or more, and particularly preferably 6% or more. On the other hand, when the content of $B_2O_3$ is too large, there is a concern that the glass becomes unstable. Accordingly, the content of $B_2O_3$ is 12% or less. The content of $B_2O_3$ is preferably 11.5% or less, more preferably 11% or less, and particularly preferably 10% or less.

In the present glass, $Al_2O_3$ is an essential component and has an effect of improving the chemical durability of the glass. When the content of $Al_2O_3$ is too small, the effect of improving the chemical durability becomes insufficient. Accordingly, the content of $Al_2O_3$ is 1.4% or more. The content of $Al_2O_3$ is preferably 1.7% or more, and more preferably 2% or more. On the other hand, when the content of $Al_2O_3$ is too large, the glass becomes unstable, which develops a strong tendency toward devitrification. Accordingly, the content of $Al_2O_3$ is 5% or less. The content of $Al_2O_3$ is preferably 4.5% or less, and more preferably 4% or less.

In the present glass, $Li_2O$ is an essential component, and a component of softening the glass. At the same time, $Li_2O$ has an effect of improving the chemical durability, and is effective for achieving low dispersion. In the present glass, when the content of $Li_2O$ is too small, the viscosity is increased to raise the glass transition temperature or the deformation point, resulting in an increase in press-molding temperature. Further, sufficient low dispersion can not be achieved. Furthermore, the effect of improving the chemical durability is reduced. Accordingly, the content of $Li_2O$ is more than 0%. The content of $Li_2O$ is preferably 0.1% or more, and more preferably 0.5% or more.

On the other hand, when the content of $Li_2O$ is too large, the glass becomes unstable, which develops a strong tendency toward devitrification. Further, the viscosity at the liquid phase temperature is decreased, so that the production of a gob preform becomes difficult. Furthermore, the chemical durability is deteriorated. Accordingly, the content of $Li_2O$ is 6% or less. The content of $Li_2O$ is preferably 5.5% or less, and more preferably 5% or less.

In the present glass, $La_2O_3$ is an essential component, and has an effect of increasing the refractive index of the glass. At the same time, $La_2O_3$ also has an effect of forming the glass to improve the chemical durability, and is also a component suitable for viscosity adjustment for fine gob formation because of its high viscosity. Accordingly, the content of $La_2O_3$ is more than 0%. The content of $La_2O_3$ is preferably 0.5% or more, and more preferably 1% or more. On the other hand, when the content of $La_2O_3$ is too large, the softening temperature is increased to deteriorate moldability, in addition to resulting in high dispersion. Accordingly, the content of $La_2O_3$ is 9% or less. The content of $La_2O_3$ is preferably 7% or less, and more preferably 4% or less.

In the present glass, MgO is an essential component and a component effective for improving the chemical durability of the glass and for achieving low dispersion. Further, by containing MgO, the glass transition point and the deformation point are decreased, and also glass mold moldability is improved. Accordingly, the content of MgO is 0.1% or more. The content of MgO is preferably 0.2% or more, and more preferably 0.4% or more. On the other hand, excessive introduction thereof increases a tendency of devitrification to make the glass unstable. Accordingly, the content of MgO is 8% or less. The content of MgO is preferably 6% or less, and more preferably 5% or less.

In the present glass, CaO is not an essential component, but a component effective for improving the chemical durability. When CaO is contained, the content of CaO is preferably 0.5% or more, and more preferably 1% or more. On the other hand, excessive introduction thereof increases a tendency of devitrification to make the glass unstable. Accordingly, even when CaO is contained, the content of CaO is 10% or less. The content of CaO is preferably 9% or less, and more preferably 7% or less.

In the present glass, SrO is not an essential component, but a component effective for improving the chemical durability. When SrO is contained, the content of SrO is preferably 0.1% or more, and more preferably 0.2% or more. On the other hand, excessive introduction thereof increases a tendency of devitrification to make the glass unstable. Accordingly, even when SrO is contained, the content of SrO is 15% or less. The content of SrO is preferably 10% or less, and more preferably 7% or less.

In the present glass, ZnO is not an essential component, but a component effective for improving the meltability, stability and durability of the glass. When ZnO is contained, the content of ZnO is preferably 0.3% or more, and more preferably 0.7% or more. On the other hand, excessive introduction thereof increases a tendency of devitrification to make the glass unstable. Accordingly, even when ZnO is contained, the content of ZnO is 5% or less. The content of ZnO is preferably 4% or less, and more preferably 3% or less.

In the present glass, $Gd_2O_3$ is not an essential component, but a component contributing to increasing the refractive index. When $Gd_2O_3$ is contained, the content of $Gd_2O_3$ is preferably 0.5% or more, and more preferably 1% or more. On the other hand, excessive introduction thereof increases a tendency of devitrification to make the glass unstable. Accordingly, even when $Gd_2O_3$ is contained, the content of $Gd_2O_3$ is 7% or less. The content of $Gd_2O_3$ is preferably 5% or less, and more preferably 3% or less.

In the present glass, $SiO_2$ is not an essential component, but a component effective for stabilizing the glass. When $SiO_2$ is contained, the content of $SiO_2$ is preferably 0.1% or more, and more preferably 0.3% or more. On the other hand, excessive introduction thereof makes it difficult to obtain the desired optical constants. Accordingly, even when $SiO_2$ is contained, the content of $SiO_2$ is 3% or less. The content of $SiO_2$ is preferably 2.5% or less, and more preferably 2% or less.

In the present glass, the total content of the above components is preferably 95% or more, because various properties are well balanced. The total content of the above components is more preferably 98% or more, and it is particularly preferred that the present glass is substantially composed of the above components. Incidentally, in this specification, the phrase "substantially composed of the above components" means "composed of the above components excluding unavoidable impurities".

In the present glass, none of the respective components of $Na_2O$, $K_2O$, $Y_2O_3$, $ZrO_2$, $Nb_2O_5$ and $Ta_2O_5$ is an essential component. However, they may be added either alone or in combination of two or more thereof. When the content thereof is small, the effect of adjusting the optical properties is hardly obtained. Accordingly, the content of each component is individually preferably 0.1% or more. The above content is more preferably 1.0% or more, and particularly preferably 2% or more.

On the other hand, regarding $Na_2O$ and $K_2O$ of the above respective components, when the content thereof is too large, the refractive index is decreased. Accordingly, the content of each component is individually preferably 5.0% or less, more preferably 4.0% or less, and particularly preferably 3.0% or less. Similarly, regarding the respective components of $Y_2O_3$, $ZrO_2$, $Nb_2O_5$ and $Ta_2O_5$, when the content thereof is increased, the glass becomes unstable. Further, raw materials thereof are relatively expensive, so that in terms of cost, it is preferred that the content of these components is suppressed as low as possible. Accordingly, the content of each component is individually preferably 5.0% or less, more preferably 4.0% or less, and particularly preferably 3.0% or less.

Further, in the present glass, from the viewpoint of molding temperature and in terms of an influence on the environment, it is preferred that PbO, $TeO_2$, F and $As_2O_3$ are not substantially contained. In this specification, the phrase "component X is not substantially contained" means that component X is not positively added, except for contamination as unavoidable impurities. As a measure thereof, the content of component X is approximately less than 0.05%.

In the present glass, $Sb_2O_3$ is not an essential component but can be added as a refining agent at the time of glass melting. The content thereof is preferably 1% or less, more preferably 0.5% or less, and particularly preferably 0.1% or less. In the present glass, the lower limit in the case where $Sb_2O_3$ is added is preferably 0.01% or more, more preferably 0.05% or more, and particularly preferably 0.1% or more.

As optical properties of the present glass, the refractive index ($n_d$) is preferably 1.59 or more, and the Abbe number ($v_d$) is 63 or more. Further, the glass having optical constants of a refractive index ($n_d$) of 1.59 or more and an Abbe number (dispersion) ($v_d$) of 66 or more, or optical constants of a refractive index ($n_d$) of 1.62 or more and an Abbe number (dispersion) ($v_d$) of 63 or more is preferred.

The glass transition point (Tg) of the present glass is preferably 570° C. or lower, and the deformation point (At) is preferably 610° C. or lower, because press-molding can be performed at high productivity.

Further, it is preferred for producing fine gobs that the viscosity ($\eta_{LT}$) at the liquid phase temperature of the present glass is 6 dPa·s or more. The viscosity at the liquid phase temperature of the present glass is more preferably 6.5 dPa·s or more, and particularly preferably 7 dPa·s or more. Incidentally, in the case of the glass having optical constants of a refractive index ($n_d$) of 1.62 or more and an Abbe number (dispersion) ($v_d$) of 63 or more, it is particularly preferred that the viscosity ($\eta_{LT}$) at the liquid phase temperature is 12 dPa·s or more.

Water resistance (Dw) of the present glass according to a powder method is preferably 0.3% or less, more preferably 0.2% or less, and particularly preferably 0.1% or less. Similarly, acid resistance (Da) thereof according to a powder method is preferably 3% or less, more preferably 2.5% or less, and particularly preferably 1.5% or less.

A method for manufacturing the present glass is not particularly limited, and, for example, the glass can be manufactured by weighing and mixing raw materials used in a common optical glass, such as oxides, hydroxides, carbonates, nitrates and phosphates; placing the resultant mixture in a crucible commonly used in an optical glass, such as a platinum crucible, a gold crucible, a quartz crucible or an alumina crucible; melting, refining and stirring it at about 1,000 to 1,250° C. for 2 to 10 hours; then, casting it into a mold pre-heated to 450 to 550° C. at a temperature higher than the liquid phase temperature ($L_T$); and thereafter, annealing the resultant product.

By using, for example, $Na_2CO_3$ as an oxide introduced as a carbonate, and $NaNO_3$ as an oxide introduced as a nitrate, respectively, of the above raw materials, spouting up of the raw materials at the time of batch melting can be suppressed to inhibit spouting out thereof. Accordingly, these raw materials may be appropriately selected in view of raw material cost and easiness of controlling foam formation at the time of production.

Examples of methods for forming gobs for a preform using the present glass include a method of allowing a molten glass to flow out from a leading edge of a nozzle, separating a lump of the molten glass having a desired mass, and receiving it in a mold while floating it with nitrogen gas above the mold, thereby producing a glass lump having a forged surface over the entire surface thereof. However, it should not be construed to being limited thereto.

Further, a method for forming the present glass into an optical element is not particularly limited. Examples thereof include a method of setting a preform prepared by the preform gob formation in a highly precisely processed press mold (for example, a SiC material or a tungsten carbide hard metal as a mold material) in which a protective coating film is formed on a mold surface, based on the glass liquid phase temperature ($L_T$) of the present glass, and pressing the preform at a specified pressure for a specified time into a desired shape; and a method of allowing a glass melt to flow out to form a plate material once, then, producing a glass lump suitable for press-molding from the plate material by processing, to form a processed preform, subsequently, setting the processed preform in a press mold, and thereafter, performing press-molding. However, it should not be construed to being limited thereto.

EXAMPLES

Examples and the like of the present invention will be described below. Examples 1 to 17 are examples of the invention.

[Chemical Composition/Method for Preparing Sample]

Raw materials were weighed so as to obtain chemical compositions (mass %) shown in Tables 1 to 3. Incidentally, these chemical compositions are also shown in Tables 4 to 6 in mol %. As the raw materials for each glass, there were used $H_3PO_4$, $BPO_4$ or $Ba(PO_3)_2$ in the case of $P_2O_5$; $H_3BO_3$ or $BPO_4$ in the case of $B_2O_3$; $BaCO_3$, $Ba(NO_3)_2$ or $Ba(PO_3)_2$ in the case of BaO; $Li_2CO_3$ or $LiPO_3$ in the case of $Li_2O$; and oxides in the case of $SiO_2$, MgO, $La_2O_3$ and ZnO, respectively.

The weighed raw materials were mixed, the resultant mixture was placed in a platinum crucible having an inner volume of about 300 cc, melted, clarified and stirred at about 1,250° C. for 1 to 1.5 hours, maintained at 1,100° C. for 1 hour, then cast into a rectangular mold having a size of 100 mm in length and 50 mm in width, which was pre-heated at about 450 to 550° C., and subsequently, annealed at a rate of about 0.5° C./min to form a sample.

[Evaluation Methods]

The refractive index ($n_d$) was the refractive index with respect to the helium d-line spectrum, and measured with a refractometer (manufactured by Kalnew Optical Industries, trade name: KRP-2000). The value of the refractive index was measured up to five decimal places.

The Abbe number ($v_d$) was calculated to two decimal places from the following equation, and rounded off to one decimal place.

$$v_d = (n_d - 1)/(n_F - n_c)$$

wherein $n_F$ and $n_c$ are the refractive indexes with respect to the hydrogen F-line and the hydrogen C-line spectra, respectively.

For each resultant glass processed into a rod shape, the glass transition temperature (Tg) and the deformation point (At) were measured at a rate of temperature increase of 5° C./min by means of a thermal analysis instrument (manufactured by Bruker AXS K.K., trade name: TMA4000SA) in a thermal expansion method.

For the liquid phase temperature ($L_T$), each about 5 g of a glass sample were placed in platinum dishes and kept at from 870 to 940° C. in intervals of 5° C. for one hour, followed by cooling under spontaneous cooling. Then, the presence or absence of crystal precipitation was observed with a microscope, and the lowest temperature at which no crystal was observed was taken as the liquid phase temperature.

With respect to a sample which was double-side polished to a thickness of 10 mm, the transmittance was measured at intervals of 1 nm using a spectral photometer (manufactured by PerkinElmer Co., Ltd., trade name: Lambda 950).

For the viscosity ($\eta_{LT}$) at the liquid phase temperature, the viscosity was measured by a rotating-cylinder method, and the viscosity measured at the liquid phase temperature was taken as the viscosity ($L_T$) at the liquid phase temperature.

With respect to the meltability and the like of the glass, as a result of visual observation at the time of preparing the above sample, it was confirmed that there was no problem in meltability, and that the resultant glass sample had no bubble and no striae.

For the specific gravity (SG), the ratio of the mass of a sample to the mass of pure water at 4° C. having the same volume as the sample, under a pressure of 101.325 kPa (standard atmospheric pressure), was indicated as the SG, and determined based on JIS Z 8807 (1976), "Measuring Method of Weighing in Liquid".

For the powder method water resistance (Dw), a granulated glass (particle size: 425 to 600 μm) having a mass corresponding to the SG was put in a platinum basket, immersed in a round-bottom flask made of quartz glass containing 80 ml of pure water (pH: 6.5 to 7.5), and treated in a boiled water bath for 60 minutes. The rate of loss in weight (%) thereof was determined.

For the powder method acid resistance (Da), a 0.01 mol/litter nitric acid aqueous solution was put in the flask, and the granulated glass was treated in the same manner as in the measuring method of Dw. The rate of loss in weight (%) thereof was determined.

TABLE 1

| Composition | Mass % | | | | | | |
|---|---|---|---|---|---|---|---|
| | Ex. 1 | Ex. 2 | Ex. 3 | Ex. 4 | Ex. 5 | Ex. 6 | Ex. 7 |
| $P_2O_5$ | 46.1 | 41.3 | 47.9 | 46.4 | 42.4 | 45.0 | 47.1 |
| BaO | 32.2 | 41.8 | 32.3 | 36.0 | 35.4 | 33.9 | 29.0 |
| $B_2O_3$ | 4.5 | 6.0 | 6.9 | 6.7 | 8.1 | 8.3 | 8.7 |
| $Al_2O_3$ | 3.5 | 3.2 | 1.7 | 3.3 | 4.7 | 4.8 | 2.5 |
| $Li_2O$ | 4.0 | 0.7 | 0.8 | 0.8 | 0.8 | 0.8 | 0.8 |
| $La_2O_3$ | 2.4 | 2.0 | 5.6 | 2.1 | 2.2 | 2.2 | 2.3 |
| MgO | 5.7 | 2.0 | 1.6 | 1.6 | 1.6 | 1.6 | 1.7 |
| CaO | 0.0 | 0.0 | 0.0 | 0.0 | 0.0 | 2.3 | 2.4 |
| SrO | 0.0 | 0.0 | 0.0 | 0.0 | 0.0 | 0.0 | 4.4 |
| ZnO | 1.6 | 3.0 | 3.2 | 3.1 | 3.2 | 1.1 | 1.1 |
| $Gd_2O_3$ | 0.0 | 0.0 | 0.0 | 0.0 | 0.0 | 0.0 | 0.0 |
| $SiO_2$ | 0.0 | 0.0 | 0.0 | 0.0 | 1.6 | 0.0 | 0.0 |
| Total of Composition | 100.0 | 100.0 | 100.0 | 100.0 | 100.0 | 100.0 | 100.0 |
| $n_d$ | 1.59929 | 1.60706 | 1.59343 | 1.59295 | 1.59382 | 1.59257 | 1.59111 |
| $v_d$ | 66.0 | 65.1 | 65.7 | 66.1 | 65.9 | 66.4 | 66.7 |
| $T_g$/° C. | 500 | 563 | 539 | 546 | 568 | 562 | 547 |
| $A_t$/° C. | 535 | 611 | 585 | 592 | 595 | 589 | 597 |
| $L_T$/° C. | 1020 | 1000 | 1040 | 1000 | 1040 | 980 | 970 |
| $\eta_{LT}$/dPa·s | 8.0 | 9.5 | 6.0 | 10.5 | 6.0 | 13.0 | 15.0 |
| SG | 3.41 | 3.65 | 3.44 | 3.46 | 3.45 | 3.40 | 3.37 |
| Dw/% | 0.04 | 0.08 | 0.05 | 0.10 | 0.10 | 0.07 | 0.04 |
| Da/% | 1.00 | 1.02 | 1.01 | 1.19 | 1.18 | 1.08 | 1.08 |

TABLE 2

| Composition | Mass % | | | | | | |
|---|---|---|---|---|---|---|---|
| | Ex. 8 | Ex. 9 | Ex. 10 | Ex. 11 | Ex. 12 | Ex. 13 | Ex. 14 |
| $P_2O_5$ | 47.7 | 47.2 | 48.3 | 47.1 | 37.8 | 45.2 | 47.7 |
| BaO | 28.7 | 28.7 | 26.7 | 29.8 | 36.2 | 29.7 | 28.7 |
| $B_2O_3$ | 9.1 | 9.9 | 10.1 | 9.9 | 4.6 | 8.8 | 8.7 |
| $Al_2O_3$ | 1.9 | 2.4 | 2.5 | 2.4 | 3.8 | 2.6 | 2.5 |
| $Li_2O$ | 2.7 | 4.4 | 4.8 | 4.4 | 3.7 | 1.5 | 1.3 |
| $La_2O_3$ | 2.4 | 2.6 | 2.7 | 1.6 | 1.2 | 2.4 | 2.3 |
| MgO | 0.4 | 0.5 | 0.5 | 0.5 | 4.8 | 1.7 | 1.7 |
| CaO | 2.5 | 2.7 | 2.8 | 2.7 | 6.6 | 2.4 | 2.1 |
| SrO | 3.4 | 0.3 | 0.3 | 0.3 | 0.0 | 4.5 | 5.0 |
| ZnO | 1.2 | 1.3 | 1.3 | 1.3 | 0.0 | 1.2 | 0.0 |
| $Gd_2O_3$ | 0.0 | 0.0 | 0.0 | 0.0 | 1.3 | 0.0 | 0.0 |
| $SiO_2$ | 0.0 | 0.0 | 0.0 | 0.0 | 0.0 | 0.0 | 0.0 |
| Total of Composition | 100.0 | 100.0 | 100.0 | 100.0 | 100.0 | 100.0 | 100.0 |
| $n_d$ | 1.59231 | 1.59312 | 1.59033 | 1.59215 | 1.62010 | 1.59117 | 1.59081 |
| $v_d$ | 66.8 | 66.9 | 67.0 | 67.0 | 63.5 | 66.8 | 67.1 |

TABLE 2-continued

| | Mass % | | | | | | |
|---|---|---|---|---|---|---|---|
| Composition | Ex. 8 | Ex. 9 | Ex. 10 | Ex. 11 | Ex. 12 | Ex. 13 | Ex. 14 |
| $T_g$/° C. | 490 | 486 | 481 | 484 | 521 | 546 | 547 |
| $A_t$/° C. | 534 | 524 | 512 | 517 | 561 | 593 | 595 |
| $L_T$/° C. | 950 | 950 | 940 | 930 | 890 | 1010 | 980 |
| $\eta_{LT}$/dPa·s | 6.0 | 6.0 | 8.0 | 7.5 | 15.0 | 9.0 | 15.0 |
| SG | 3.33 | 3.27 | 3.22 | 3.27 | 3.55 | 3.34 | 3.34 |
| Dw/% | 0.05 | 0.08 | 0.08 | 0.05 | 0.07 | 0.06 | 0.08 |
| Da/% | 1.06 | 1.32 | 1.20 | 1.34 | 0.99 | 0.86 | 1.07 |

TABLE 3

| | Mass % | | |
|---|---|---|---|
| Composition | Ex. 15 | Ex. 16 | Ex. 17 |
| $P_2O_5$ | 46.9 | 43.5 | 40.1 |
| BaO | 26.9 | 21.4 | 31.9 |
| $B_2O_3$ | 8.6 | 11.1 | 2.6 |
| $Al_2O_3$ | 2.5 | 3.3 | 4.6 |
| $Li_2O$ | 1.2 | 3.8 | 3.8 |
| $La_2O_3$ | 2.3 | 1.3 | 1.2 |
| MgO | 1.7 | 3.7 | 5.4 |
| CaO | 2.1 | 0.0 | 6.7 |
| SrO | 7.8 | 12.0 | 0.0 |
| ZnO | 0.0 | 0.0 | 2.4 |
| $Gd_2O_3$ | 0.0 | 0.0 | 1.3 |
| $SiO_2$ | 0.0 | 0.0 | 0.0 |
| Total of Composition | 100.0 | 100.0 | 100.0 |
| $n_d$ | 1.59236 | 1.59259 | 1.61826 |
| $v_d$ | 66.5 | 67.0 | 63.7 |
| $T_g$/° C. | 541 | 513 | 504 |
| $A_t$/° C. | 585 | 551 | 550 |
| $L_T$/° C. | 970 | 980 | 910 |
| $\eta_{LT}$/dPa·s | 16.0 | 15.0 | 9.5 |
| SG | 3.34 | 3.29 | 3.53 |
| Dw/% | 0.09 | 0.07 | 0.08 |
| Da/% | 1.65 | 2.49 | 0.97 |

TABLE 4

| | Mol % | | | | | | |
|---|---|---|---|---|---|---|---|
| Composition | Ex. 1 | Ex. 2 | Ex. 3 | Ex. 4 | Ex. 5 | Ex. 6 | Ex. 7 |
| $P_2O_5$ | 34.6 | 36.4 | 43.0 | 40.9 | 35.9 | 38.1 | 39.2 |
| BaO | 22.4 | 34.1 | 26.8 | 29.3 | 27.8 | 26.6 | 22.4 |
| $B_2O_3$ | 6.8 | 10.9 | 12.6 | 12.1 | 14.0 | 14.2 | 14.7 |
| $Al_2O_3$ | 3.7 | 3.9 | 2.1 | 4.0 | 5.6 | 5.7 | 2.9 |
| $Li_2O$ | 14.4 | 3.1 | 3.3 | 3.2 | 3.2 | 3.2 | 3.3 |
| $La_2O_3$ | 0.8 | 0.8 | 2.2 | 0.8 | 0.8 | 0.8 | 0.8 |
| MgO | 15.2 | 6.2 | 5.0 | 4.8 | 4.8 | 4.9 | 5.0 |
| CaO | 0.0 | 0.0 | 0.0 | 0.0 | 0.0 | 4.9 | 5.0 |
| SrO | 0.0 | 0.0 | 0.0 | 0.0 | 0.0 | 0.0 | 5.0 |
| ZnO | 2.1 | 4.7 | 5.0 | 4.8 | 4.8 | 1.6 | 1.7 |
| $Gd_2O_3$ | 0.0 | 0.0 | 0.0 | 0.0 | 0.0 | 0.0 | 0.0 |
| $SiO_2$ | 0.0 | 0.0 | 0.0 | 0.0 | 3.2 | 0.0 | 0.0 |
| Total of Composition | 100.0 | 100.0 | 100.0 | 100.0 | 100.0 | 100.0 | 100.0 |

TABLE 5

| | Mol % | | | | | | |
|---|---|---|---|---|---|---|---|
| Composition | Ex. 8 | Ex. 9 | Ex. 10 | Ex. 11 | Ex. 12 | Ex. 13 | Ex. 14 |
| $P_2O_5$ | 38.5 | 36.1 | 36.4 | 36.0 | 27.3 | 36.8 | 39.4 |
| BaO | 21.4 | 20.3 | 18.7 | 21.1 | 24.2 | 22.4 | 22.0 |
| $B_2O_3$ | 15.0 | 15.5 | 15.6 | 15.4 | 6.8 | 14.7 | 14.8 |
| $Al_2O_3$ | 2.1 | 2.6 | 2.6 | 2.5 | 3.8 | 2.9 | 2.9 |
| $Li_2O$ | 10.3 | 16.0 | 17.1 | 15.9 | 12.9 | 5.7 | 5.0 |
| $La_2O_3$ | 0.9 | 0.9 | 0.9 | 0.5 | 0.4 | 0.8 | 0.8 |
| MgO | 1.2 | 1.2 | 1.2 | 1.2 | 12.1 | 5.0 | 5.0 |
| CaO | 5.1 | 5.3 | 5.3 | 5.3 | 12.1 | 5.0 | 4.4 |
| SrO | 3.8 | 0.3 | 0.4 | 0.3 | 0.0 | 5.0 | 5.7 |
| ZnO | 1.7 | 1.8 | 1.8 | 1.8 | 0.0 | 1.7 | 0.0 |
| $Gd_2O_3$ | 0.0 | 0.0 | 0.0 | 0.0 | 0.4 | 0.0 | 0.0 |
| $SiO_2$ | 0.0 | 0.0 | 0.0 | 0.0 | 0.0 | 0.0 | 0.0 |
| Total of Composition | 100.0 | 100.0 | 100.0 | 100.0 | 100.0 | 100.0 | 100.0 |

TABLE 6

| | Mol % | | |
|---|---|---|---|
| Composition | Ex. 15 | Ex. 16 | Ex. 17 |
| $P_2O_5$ | 38.6 | 31.4 | 28.6 |
| BaO | 20.5 | 14.3 | 21.0 |
| $B_2O_3$ | 14.4 | 16.4 | 3.8 |
| $Al_2O_3$ | 2.9 | 3.3 | 4.5 |
| $Li_2O$ | 4.9 | 13.0 | 12.8 |
| $La_2O_3$ | 0.8 | 0.4 | 0.4 |
| MgO | 4.9 | 9.4 | 13.5 |
| CaO | 4.3 | 0.0 | 12.0 |
| SrO | 8.7 | 11.8 | 0.0 |
| ZnO | 0.0 | 0.0 | 3.0 |
| $Gd_2O_3$ | 0.0 | 0.0 | 0.4 |
| $SiO_2$ | 0.0 | 0.0 | 0.0 |
| Total of Composition | 100.0 | 100.0 | 100.0 |

While the invention has been described in detail with reference to specific embodiments thereof, it will be apparent to one skilled in the art that various changes and modifications can be made therein without departing from the spirit and scope thereof.

The present application is based on Japanese Patent Applications No. 2010-177395 filed on Aug. 6, 2010 and No. 2011-159941 filed on Jul. 21, 2011, and their contents are incorporated herein by reference. All references cited herein are incorporated in their entirety.

INDUSTRIAL APPLICABILITY

The present glass has a novel composition having a refractive index $n_d$ of 1.59 or more and an Abbe number (dispersion) $v_d$ of 63 or more, and is useful as an optical glass for precision press-molding in which chemical durability and low dispersibility are consistent with each other.

What is claimed is:

1. An optical glass, comprising, in % by weight on an oxide basis,
   30 to 50% of $P_2O_5$,
   18 to 43% of BaO,
   2 to 12% of $B_2O_3$,
   1.4 to 5% of $Al_2O_3$,
   more than 0 to 6% of $Li_2O$,
   more than 0 to 9% of $La_2O_3$,
   0.1 to 8% of MgO,
   0 to 10% of CaO,
   0 to 15% of SrO,
   0 to 5% of ZnO,
   0 to 7% of $Gd_2O_3$, and
   0 to 3% of $SiO_2$,
   wherein the optical glass has a refractive index $n_d$ of 1.59 to 1.63 and an Abbe number $v_d$ of 63 to 68.

2. The optical glass according to claim 1, wherein the refractive index $n_d$ is 1.59 or more and the Abbe number $v_d$ is 66 or more.

3. The optical glass according to claim 1, wherein the refractive index $n_d$ is 1.62 or more and the Abbe number $v_d$ is 63 or more.

4. The optical glass according to claim 1, wherein the optical glass has a viscosity ($\eta_{LT}$) at a liquid phase temperature of 6 dPa·s or more.

5. The optical glass according to claim 4, wherein the viscosity ($\eta_{LT}$) at the liquid phase temperature is 12 dPa·s or more.

6. The optical glass according to claim 1, wherein $La_2O_3$ is included in an amount of from 0.5% to 9% in % by weight on the oxide basis.

7. The optical glass according to claim 1, wherein $La_2O_3$ is included in an amount of from 1% to 9% in % by weight on the oxide basis.

8. The optical glass according to claim 1, wherein $La_2O_3$ is included in an amount of from 1% to 4% in % by weight on the oxide basis.

9. The optical glass according to claim 1, wherein $Li_2O$ is included in an amount of from 0.1% to 6% in % by weight on the oxide basis.

10. The optical glass according to claim 1, wherein $Li_2O$ is included in an amount of from 0.5% to 5% in % by weight on the oxide basis.

11. The optical glass according to claim 1, wherein CaO is included in an amount of from 0.5% to 9% in % by weight on the oxide basis.

12. The optical glass according to claim 1, wherein SrO is included in an amount of from 0.1% to 10% in % by weight on the oxide basis.

13. The optical glass according to claim 1, wherein ZnO is included in an amount of from 0.3% to 4% in % by weight on the oxide basis.

14. The optical glass according to claim 1, wherein $Gd_2O_3$ is included in an amount of from 0.5% to 5% in % by weight on the oxide basis.

15. The optical glass according to claim 1, wherein $SiO_2$ is included in an amount of from 0.1% to 2.5% in % by weight on the oxide basis.

16. The optical glass according to claim 1, wherein $La_2O_3$ is included in an amount of from 1% to 4%, $Li_2O$ is included in an amount of from 0.5% to 5%, CaO is included in an amount of from 1% to 7%, SrO is included in an amount of from 0.2% to 7%, ZnO is included in an amount of from 0.7% to 3%, $Gd_2O_3$ is included in an amount of from 1% to 3%, and $SiO_2$ is included in an amount of from 0.3% to 2%, in % by weight on the oxide basis.

* * * * *